United States Patent
Akkaya et al.

(10) Patent No.: US 10,931,894 B2
(45) Date of Patent: Feb. 23, 2021

(54) TUNABLE SPECTRAL ILLUMINATOR FOR CAMERA

(71) Applicant: Microsoft Technology Licensing, LLC, Redmond, WA (US)

(72) Inventors: Onur Can Akkaya, Palo Alto, CA (US); Sergio Ortiz Egea, San Jose, CA (US); Cyrus Soli Bamji, Fremont, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 104 days.

(21) Appl. No.: 16/176,271

(22) Filed: Oct. 31, 2018

(65) Prior Publication Data

US 2020/0137324 A1    Apr. 30, 2020

(51) Int. Cl.
*H04N 5/33* (2006.01)
*G06T 7/521* (2017.01)
*G02F 1/21* (2006.01)

(52) U.S. Cl.
CPC ............ *H04N 5/332* (2013.01); *G02F 1/216* (2013.01); *G06T 7/521* (2017.01); *G02F 2001/213* (2013.01); *G06T 2207/10028* (2013.01); *G06T 2207/10048* (2013.01)

(58) Field of Classification Search
None
See application file for complete search history.

(56) References Cited

U.S. PATENT DOCUMENTS

| | | |
|---|---|---|
| 5,452,127 A | 9/1995 | Wagner |
| 5,764,316 A | 6/1998 | Takizawa et al. |
| 5,815,204 A | 9/1998 | Ogawa et al. |
| 6,456,793 B1 * | 9/2002 | Ray .................. G01S 17/89 250/214 VT |
| 6,633,354 B2 | 10/2003 | Li et al. |
| 7,187,452 B2 | 3/2007 | Jupp et al. |
| 7,310,125 B2 | 12/2007 | Kim et al. |
| 7,342,658 B2 | 3/2008 | Kowarz et al. |

(Continued)

FOREIGN PATENT DOCUMENTS

| | | |
|---|---|---|
| EP | 1058147 A2 | 12/2000 |
| WO | 2012057558 A2 | 5/2012 |
| WO | 2017149370 A1 | 9/2017 |

OTHER PUBLICATIONS

"Multispectral Optical Filter Assemblies", Retrieved From https://web.archive.org/web/20130912193244/https:/www.photonicsonline.com/doc/multispectral-optical-filter-assemblies-0001, Sep. 12, 2013, 1 Page.

(Continued)

*Primary Examiner* — William B Perkey
(74) *Attorney, Agent, or Firm* — Alleman Hall Creasman & Tuttle LLP (57) ABSTRACT

A camera includes one or more spectral illuminators, a tunable optical filter optically intermediate the one or more spectral illuminators and a scene, and a sensor array. The one or more spectral illuminators are configured to emit active spectral light. The tunable optical filter is dynamically adjustable to change a selected sub-band of the active spectral light that illuminates the scene. The sensor array includes a plurality of sensors each configured to measure spectral light reflected from the scene in the selected sub-band.

20 Claims, 7 Drawing Sheets

(56) References Cited

U.S. PATENT DOCUMENTS

| | | | |
|---|---|---|---|
| 7,355,723 B2* | 4/2008 | Carr | G01H 9/006 |
| | | | 356/35.5 |
| 7,375,803 B1 | 5/2008 | Bamji | |
| 7,420,656 B1 | 9/2008 | Sandusky et al. | |
| 7,446,299 B2 | 11/2008 | Kobayashi | |
| 7,652,736 B2 | 1/2010 | Padiyath et al. | |
| 7,835,002 B2 | 11/2010 | Muhammed et al. | |
| 8,109,634 B2 | 2/2012 | Gil | |
| 8,780,113 B1 | 7/2014 | Ciurea et al. | |
| 9,060,110 B2 | 6/2015 | Imai | |
| 9,316,865 B2 | 4/2016 | Osterman et al. | |
| 9,551,616 B2 | 1/2017 | McQuilkin et al. | |
| 9,595,239 B2 | 3/2017 | Drolet et al. | |
| 9,823,128 B2 | 11/2017 | Pau et al. | |
| 10,009,554 B1 | 6/2018 | Miao et al. | |
| 10,180,385 B2 | 1/2019 | Fox et al. | |
| 10,452,947 B1* | 10/2019 | Ahmed | G06K 9/2018 |
| 2005/0030416 A1 | 2/2005 | Kametani et al. | |
| 2006/0067668 A1 | 3/2006 | Kita | |
| 2010/0140461 A1 | 6/2010 | Sprigle et al. | |
| 2012/0019834 A1 | 1/2012 | Bornhop | |
| 2012/0287247 A1 | 11/2012 | Stenger et al. | |
| 2013/0176482 A1 | 7/2013 | Hirasawa et al. | |
| 2014/0078459 A1* | 3/2014 | Kim | G02F 1/17 |
| | | | 349/193 |
| 2014/0152944 A1 | 6/2014 | Zhao | |
| 2014/0218736 A1 | 8/2014 | Saari et al. | |
| 2014/0378843 A1 | 12/2014 | Valdes et al. | |
| 2015/0304637 A1 | 10/2015 | Shin et al. | |
| 2016/0033806 A1 | 2/2016 | Lavrentovich et al. | |
| 2016/0103015 A1 | 4/2016 | Ichihashi | |
| 2016/0164261 A1* | 6/2016 | Warren | H01S 5/18388 |
| | | | 348/164 |
| 2016/0249810 A1 | 9/2016 | Darty et al. | |
| 2016/0266255 A1 | 9/2016 | Nishikawa et al. | |
| 2016/0337569 A1 | 11/2016 | Prabhakar | |
| 2017/0140221 A1 | 5/2017 | Ollila et al. | |
| 2017/0223316 A1 | 8/2017 | Leng et al. | |
| 2017/0230551 A1 | 8/2017 | Akkaya et al. | |
| 2017/0248811 A1 | 8/2017 | Clemen et al. | |
| 2019/0037115 A1 | 1/2019 | Yasugi et al. | |
| 2019/0349536 A1* | 11/2019 | Ortiz Egea | H04N 5/33 |
| 2019/0373186 A1* | 12/2019 | Ortiz Egea | G06K 9/00268 |
| 2020/0036914 A1 | 1/2020 | Van Der Sijde et al. | |
| 2020/0154029 A1 | 5/2020 | Mitsui et al. | |

OTHER PUBLICATIONS

"Notice of Allowance Issued in U.S. Appl. No. 15/987,852", dated Jun. 27, 2019, 18 Pages.

Hansard, et al., "Time-of-Flight Cameras: Principles, Methods and Applications", Published in Springer Briefs in Computer Science, Dec. 7, 2012, 103 Pages.

Kim, et al., "A 1.5Mpixel RGBZ CMOS Image Sensor for Simultaneous Color and Range Image Capture", In Proceedings of IEEE International Solid-State Circuits Conference Digest of Technical Papers, Feb. 19, 2012, pp. 391-393.

Lee, et al., "Electrically switchable visible to infra-red dual frequency cholesteric liquid crystal light shutter", In Journal of Materials Chemistry C, Mar. 19, 2018, 9 Pages.

Mathies, Daven, "Panasonic's new organic sensor can switch between visible and NIR sensitivity", Retrieved from: https://www.digitaltrends.com/photography/panasonic-organic-visible-nir-sensor/, Feb. 10, 2017, 11 Pages.

"International Search Report and Written Opinion Issued in PCT Patent Application No. PCT/US19/030985", dated Jul. 30, 2019, 12 Pages.

Xiang, et al., "Electrically Tunable Selective Reflection of Light from Ultraviolet to Visible and Infrared by Heliconical Cholesterics", In Journal of Advanced Materials, vol. 27, Issue 19, Mar. 27, 2015, pp. 3014-3018.

"Non Final Office Action Issued in U.S. Appl. No. 16/681,674", dated Jun. 5, 2020, 07 Pages.

"International Search Report and Written Opinion Issued in PCT Application No. PCT/US2019/058570", dated May 4, 2020, 13 Pages.

Tominaga, et al., "Spectral Imaging by Synchronizing Capture and Illumination", In Journal of the Optical Society of America A, vol. 29, Issue 9, Sep., 2012, pp. 1764-1775.

"Non-Final Office Action Issued in U.S. Appl. No. 16/681,674", dated Sep. 21, 2020, 8 Pages.

* cited by examiner

TUNABLE SPECTRAL ILLUMINATOR FOR CAMERA

BACKGROUND

Typical digital cameras output images that include, for each pixel, a value for each of one or more color channels (e.g., red, green, blue). Such digital cameras can output different values for a particular color channel depending on the ambient light and/or other factors. In some examples, a typical digital camera may include an optical filter to control what portion of the electromagnetic spectrum reaches image sensors of the digital camera.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A camera includes one or more spectral illuminators, a tunable optical filter optically intermediate the one or more spectral illuminators and a scene, and a sensor array. The one or more spectral illuminators are configured to emit active spectral light. The tunable optical filter is dynamically adjustable to change a selected sub-band of the active spectral light that illuminates the scene. The sensor array includes a plurality of sensors each configured to measure spectral light reflected from the scene in the selected sub-band.

DETAILED DESCRIPTION

This description is directed to an ambient invariant, depth and hyper-spectral camera that incorporates a tunable optical filter positioned between a spectral illumination source and the imaged scene such that the tunable optical filter selectively filters active spectral light emitted from the spectral illumination source towards the scene. The tunable optical filter is dynamically adjustable to change a selected sub-band of the active spectral light that illuminates the scene imaged by the camera. In other words, the tunable optical filter selectively transmits active spectral light in different sub-bands so that spectral image data may be acquired in the different sub-bands.

By positioning the tunable optical filter operatively intermediate the spectral illumination source and the scene, a selected sub-band of active spectral light may illuminate the scene and spectral light reflected from the scene in the selected sub-band can be measured by a sensor array without the reflected spectral light having to be filtered by an optical filter positioned between the sensor array and the scene. Such a configuration enables the camera to have a larger field of view among other advantages described herein. Although the tunable optical filter is described in the context of a multi-/hyper-spectral+depth camera, the herein described concepts are broadly applicable to other types of cameras, such as cameras that include a broad-band illumination source and cameras without depth-finding capabilities.

Figure 1A:
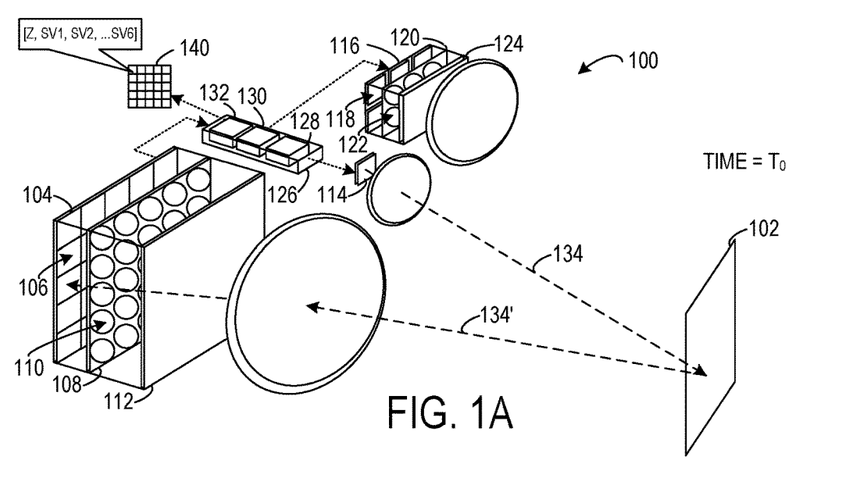
FIGS. 1A-1C are exploded, schematic views showing aspects of an example camera.
Figure 1B:
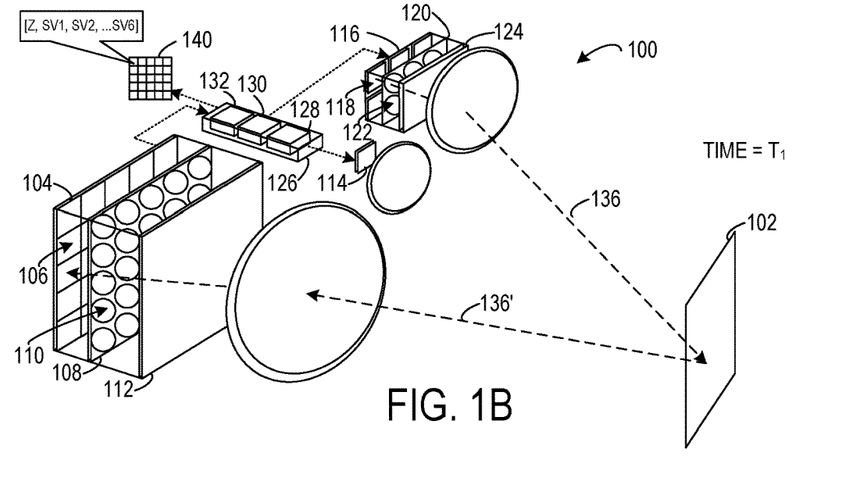
Figure 1C:
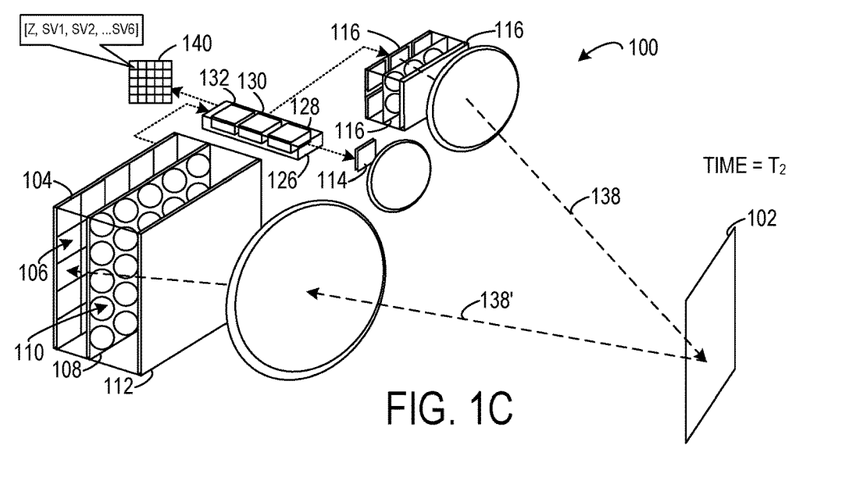

FIGS. 1A-1C shows aspects of an example camera 100. The term 'camera' refers herein to any imaging component having at least one optical aperture and sensor array configured to image a scene or subject 102. Camera 100 includes sensor array 104 of individually addressable sensors 106. In some implementations, the sensors may be complementary metal-oxide semiconductor (CMOS) elements, but other suitable architectures are envisaged as well. Each sensor is responsive to light over a broad wavelength band. For silicon-based sensors, the wavelength response may range from 300 to 1100 nm, for example. Sensor array 104 is schematically illustrated with only twenty-five sensors 106 for simplicity, although there is no theoretical limitation to the number of sensors 106.

In some implementations, the sensors 106 of sensor array 104 may be differential sensors. Each differential sensor may include different collection regions that are energized according to two different clock signals. In one example, to measure modulated active illumination, the two clock signals may be substantially complementary (e.g., the two clock signals have 50% duty cycles that are 180 degrees out of phase). In other examples, the two different clock signals may have a different relationship, such as for measuring ambient illumination or non-modulated active illumination. When the different regions are activated based on the corresponding clock signal, electric fields are created that attract and collect photoelectric charges in the different regions. The different regions may be separated by a p-type doped area that creates a barrier that ensures charges collected in one region do not transfer to an adjacent region even if one is at a higher potential.

Such operation allows for the same sensor array to be used to measure active light across a broad spectrum including ultraviolet, visible, NIR, and IR light. Further, the differential sensors may reduce system noise because only one read operation is required to perform a differential measurement of active spectral light and ambient light (i.e., (active light plus ambient light) minus ambient light). In particular, each pixel readout/reset operation may add system noise per occurrence. Thus, rather than performing two separate measurements (i.e., active, passive) that require two readouts, and then adding (or subtracting) each result to memory, a single differential measurement may be performed within the pixel and the single differential measurement may be read out to memory.

In other camera implementations that do not include sensor arrays of differential sensors, additional clock cycles may be required to perform a differential measurement. While differential sensors provide the advantages described herein, it will be appreciated that any suitable type of sensor array, including non-differential sensor arrays, may be implemented.

Microlens array 108 optionally may be arranged directly over sensor array 104. Microlens array 108 includes a plurality of microlens elements 110. Each microlens element 110 of microlens array 108 may be registered to a differential sensor 106 of the sensor array 104. When included, microlens array 108 may provide a larger effective fill factor at each of the sensors, for increased collection efficiency and reduced cross-talk between pixels.

Optical shutter 112 optionally may be arranged over sensor array 104, so as to optically cover the sensor array. When included, the optical shutter 112 is switchable electronically between different light-filtering states. In one example, the optical shutter 112 may include two or more light filtering states. In one filtering state, the optical shutter 112 may transmit IR light and block light outside of the IR band (e.g., visible light). In another filtering state, the optical shutter 112 may transmit visible light and block light outside of the visible light sub-band (e.g., IR light). The optical shutter 112 may increase a signal-to-noise ratio of IR images and visible light images acquired by the sensor array 104. The optical shutter 112 may include any suitable type of filter that transmits a narrow-band of light without significantly reducing the intensity of the in-band signal received by the sensor array. In one example, the optical shutter may include one or more liquid crystal layers.

In some implementations, the optical shutter may be omitted from the camera 100. For example, the optical shutter may be omitted in order to reduce a cost and/or complexity of an imaging optical stack. In some cases, omitting the optical shutter may allow the imaging optical stack to have a larger field of view, because an imaging lens can be designed without the added complexity of having a tunable filter in the imaging optical stack.

An IR illuminator 114 is configured to emit active IR light to illuminate the scene 102. In one example, the IR illuminator 114 includes an IR laser configured to emit IR light. In some implementations, the IR illuminator 114 optionally may include a diffuser positioned in between the IR illuminator 114 and the scene 102. The diffuser may diffuse IR light emitted from the IR illuminator 114 to produce a field of illumination that illuminates the scene 102 with IR light.

A spectral illumination source 116 is configured to emit active spectral light to illuminate the scene 102. The spectral illumination source may include one or more spectral illuminators 118. In the depicted implementation, the spectral illumination source 116 includes six spectral illuminators 118. In some implementations, the plurality of spectral illuminators 118 each may be configured to emit active spectral light in a different sub-band. In some implementations, multiple illuminators may emit active spectral light in overlapping sub-bands. Each of the spectral illuminators may be individually controllable—e.g., a single spectral illuminator may be activated while the other spectral illuminators remain deactivated. The plurality of spectral illuminators 118 may take any suitable form. In one example, the spectral illuminators 118 include light emitting diodes (LEDs) configured to emit active spectral light. There is not a theoretical limit on the number of spectral illuminators that may be used, nor on the spectral-light sub-bands that each spectral illuminator may be configured to emit.

In one example implementation, a camera may include, in addition to the IR source 114, six spectral illuminators respectively configured to emit deep blue (460 nm), blue (470 nm), true green (528 nm), yellow (587 nm), amber (617 nm), and red (625 nm). In an example implementation, each spectral illuminator may have a full width at half maximum (FWHM) of 20 nm, and a field of illumination (FOI) of 80 degrees. While not required, the camera 100 typically includes more than three spectral illuminators. In some implementations, the spectral illuminators may emit light in other sub-bands, such as hyper-red, near IR, or IR.

In other implementations, a camera may include a broad-band illumination source, such as a white light source. The broad-band illumination source may be employed instead of the plurality of spectral illuminators. In some implementations, the broad-band illumination source may be modulated. In other implementations, the broad-band illumination source may be un-modulated. In general, although the camera 100 is described in the context of a multi-/hyper-spectral+depth camera capable of acquiring both multi-spectral image data and depth data, both of these features are optional.

Collimating lens array 120 optionally may be arranged directly in front of the plurality of spectral illuminators 118. Collimating lens array 120 includes a plurality of collimating lenses 122. Each collimating lens 122 of collimating lens array 120 may be registered to a different spectral illuminator 118 such that each collimating lens is operatively intermediate the corresponding spectral illuminator 118 and the scene 102. Each collimating lens 122 is configured to collimate active spectral light emitted from the corresponding spectral illuminator 118.

A tunable optical filter 124 is arranged optically intermediate the spectral illumination source 116 and the scene 102. The tunable optical filter 124 is configured to receive active spectral light emitted from the spectral illumination source 116 and selectively transmit active spectral light in a selected sub-band to illuminate the scene 102. The tunable optical filter 124 may be configured to substantially block spectral light outside of the selected sub-band. For example, the selected sub-band may be a narrow sub-band (e.g., having a transmission peak of approximately 1 nm). The tunable optical filter 124 is dynamically adjustable to change a selected sub-band of the active spectral light that illuminates the scene 102. For example, the tunable optical filter 124 may be dynamically adjusted to transmit spectral light in a selected sub-band (e.g., 470 nm) and substantially block spectral light outside of the selected sub-band. Subsequently, the tunable optical filter 124 may be dynamically adjusted to transmit spectral light in another narrow sub-band (e.g., 475 nm) and substantially block spectral light outside of the selected sub-band. In this way, the tunable optical filter 124 may be dynamically adjusted to selectively transmit different narrow sub-bands within the emission band of at least one active spectral illuminator. It will be appreciated that the tunable optical filter may be dynamically adjusted to any suitable different sub-bands within any suitable emission band of a spectral illuminator. In another example, the tunable optical filter may be dynamically adjusted to transmit spectral light in different selected sub-bands that are within different emission bands of different spectral illuminators. In one example the tunable optical filter 124 may be adjusted to transmit spectral light at 470 nm with the emission band of a blue spectral illuminator. Subsequently, the tunable optical filter may be dynamically adjusted to transmit spectral light at 625 nm within the emission band of a red spectral illuminator. In this way, the tunable optical filter 124 may be dynamically adjusted to sequentially illuminate the scene 102 with active spectral light in a plurality of different sub-bands corresponding to each of a plurality of different emission bands of different spectral illuminators in order to acquire spectral image data for multi- or hyper-spectral imaging.

The tunable optical filter 124 may be dynamically adjustable to selectively transmit any suitable sub-band(s) of light while substantially blocking spectral light outside of the plurality of selected sub-band(s). Aspects of the tunable optical filter 124 with be discussed in further detail below with reference to FIG. 3.

When included, collimating lens array 120 may output collimated active spectral light to the tunable optical filter 124 with a small angle of incidence (AOI). The small AOI enables increased peak transmission of active spectral light in a selected sub-band while also creating sharper sub-band boundaries that lead to narrow band transmission and therefore increased spectral SNR of spectral image data acquired based on the selectively transmitted active spectral light that illuminates the scene 102.

Electronic controller 126 may include a logic machine and associated storage machine. The storage machine may hold instructions that cause the logic machine to enact any operation, algorithm, computation, or transformation disclosed herein. In some implementations, the logic machine may take the form of an application-specific integrated circuit (ASIC) or system-on-a-chip (SoC), in which some or all of the instructions are hardware- or firmware-encoded. Electronic controller 126 includes a depth controller machine 128, a spectral controller machine 130, and an output machine 132. Machines 128, 130, 132 may be implemented as separate physical hardware and/or firmware components or incorporated into a single hardware and/or firmware component.

The depth controller machine 128 is configured to activate the IR illuminator 114 and synchronously address the sensors 106 of sensor array 104 to acquire IR images. When optical shutter 112 is included, the depth controller machine 128 is further configured to switch the optical shutter 112 to block light outside of the IR light sub-band in synchronicity with activation of the IR illuminator 114 and address of the sensor array 104. In the example shown in FIG. 1A, at time $T_0$, the depth controller machine 128 adjusts the optical shutter 112, activates the IR illuminator 114 to illuminate the scene 102 with active IR light 134, and addresses the sensors 106 of sensor array 104 in synchronicity to measure an aspect of the active IR light emitted from the IR illuminator and reflected from the scene. In particular, IR light 134' reflects from the scene 102 back to the camera 100, is transmitted through the optical shutter 112, and is incident on the sensors 106 of the sensor array 104 for IR image acquisition. Note that the depth controller machine 128 may acquire a plurality of IR images in the process of acquiring a depth map.

FIG. 1B shows camera 100 measuring spectral light in a first selected sub-band emitted by a first spectral illuminator. In the depicted example, at time $T_1$, the spectral controller machine 130 activates the first spectral illuminator to emit active spectral light in the first selected sub-band (e.g., blue) and deactivates the other spectral illuminators of the plurality of spectral illuminators 118. The spectral controller machine 130 synchronously, dynamically adjusts the tunable optical filter 124 to selectively transmit active spectral light in the first selected sub-band (e.g., blue) while substantially blocking light outside of the first selected sub-band, thus illuminating the scene 102 in active spectral light 136 in the first selected sub-band (e.g., blue). Active spectral light 136' in the first selected sub-band reflects from the scene 102 back to the camera 100 and is incident on the sensors 106 used to measure the depth to scene 102. The spectral controller machine 130 synchronously addresses the sensors 106 of sensor array 104 to acquire spectral image data for the first selected sub-band (e.g., blue).

In some examples, the spectral controller machine 130 may change (e.g., tune) the transmission wavelength of the tunable optical filter 124 to sequentially select multiple narrow sub-bands that are within the emission band or spectrum of the blue spectral illuminator to acquire spectral data for the different narrow sub-bands.

Further, as shown in FIG. 1C, at time Ta, the spectral controller machine 122 activates a second spectral illuminator to emit active spectral light in a second selected sub-band (e.g., green) and deactivates other spectral illuminators of the plurality of spectral illuminators 118. The spectral controller machine 130 synchronously, dynamically adjusts the tunable optical filter 124 to selectively transmit active spectral light in the second selected sub-band (e.g., green) while substantially blocking light outside of the second selected sub-band, thus illuminating the scene 102 in active spectral light 138 in the second selected sub-band (e.g., green). Active spectral light 138' in the second selected sub-band reflects from the scene 102 back to the camera 100 and is incident on the sensors 106 used to measure the depth to scene 102. The spectral controller machine 130 synchronously addresses the sensors 106 of sensor array 104 to acquire spectral image data for the second selected sub-band (e.g., green).

In some examples, the spectral controller machine 130 may change (e.g., tune) the transmission wavelength of the tunable optical filter 124 to sequentially select multiple narrow sub-bands that are within the emission band or spectrum of the green spectral illuminator to acquire spectral data for the different narrow sub-bands.

In some examples, the spectral controller machine 130 may sequentially activate the plurality of spectral illuminators 118 one at a time in synchronicity with adjusting the tunable optical filter 124 and addressing the sensor array 104 to acquire spectral light image data in each of the plurality of sub-bands for each of the plurality of spectral illuminators 118. In some examples, the spectral controller machine 130 may activate a set including more than one spectral illuminator in synchronicity with adjusting the tunable optical filter 124 to a selected sub-band—for example when light from two or more spectral illuminators at least partially overlaps the selected sub-band. In other implementations where the spectral illumination source includes a broad-band spectral illuminator, the spectral controller machine 130 may activate the broad-band spectral illuminator in synchronicity with dynamically adjusting the tunable optical filter 124 to a selected sub-band. The tunable optical filter may selectively transmit spectral light emitted from the broad-band spectral illuminator in the selected sub-band while blocking light outside of the selected sub-band. The spectral controller machine 130 may address the sensor array 104 to acquire spectral image data for the selected sub-band.

Figure 2A:
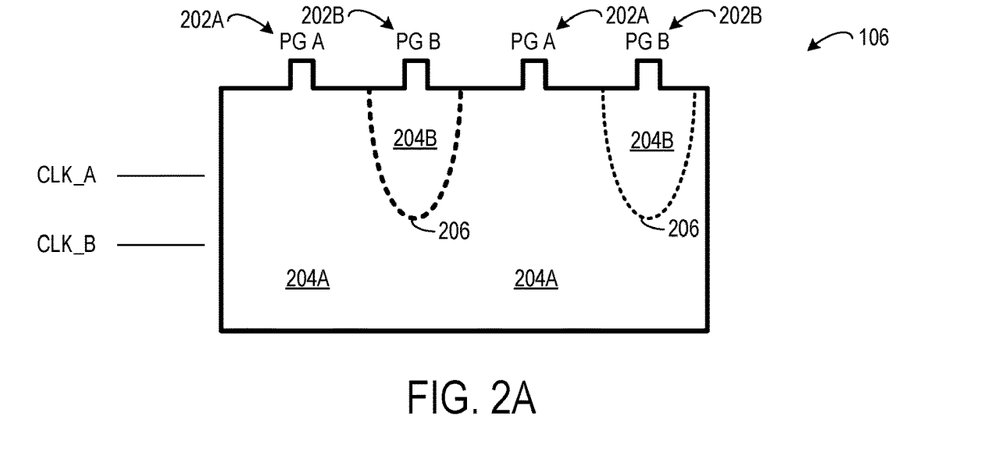
FIGS. 2A-2C schematically show aspects of a differential sensor of a sensor array.
Figure 2B:
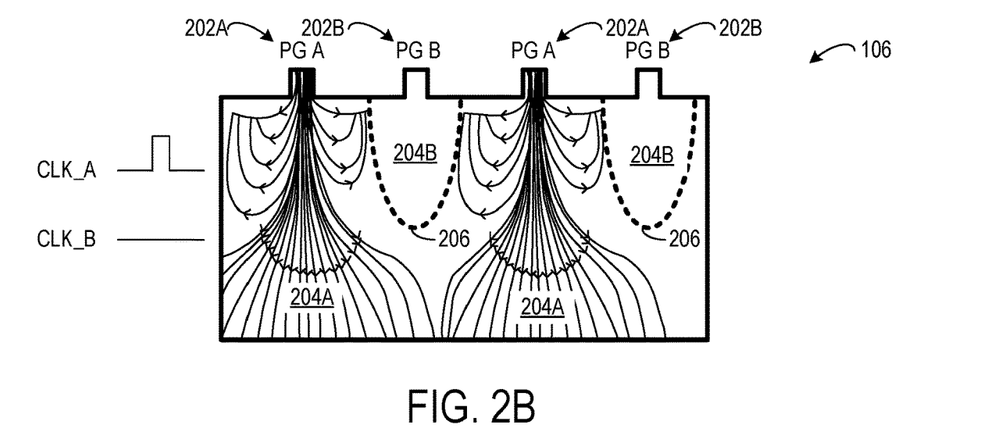
Figure 2C:
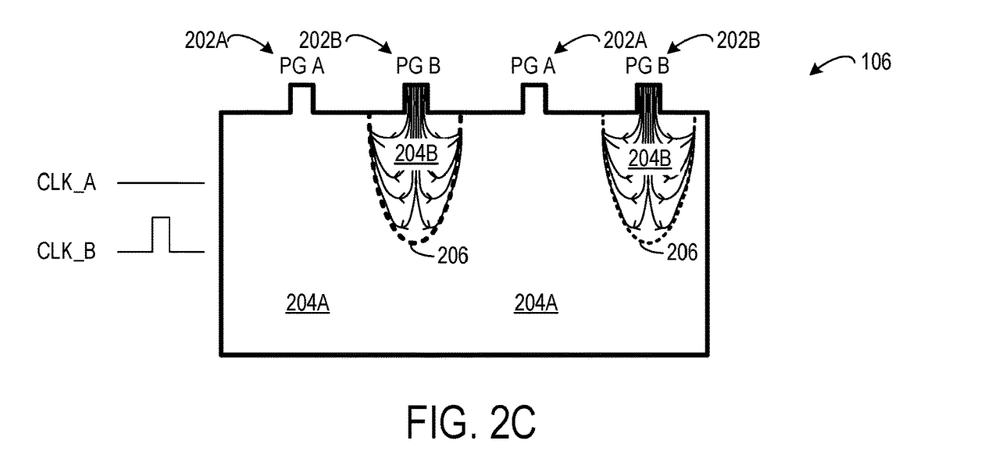

In some implementations, the sensors 106 of sensor array 104 may be differential sensors. FIGS. 2A, 2B, and 2C are cross-sectional views showing aspects of an example differential sensor 106 of sensor array 104 that optionally may be implemented in a camera utilizing a tunable optical filter for the spectral illumination source, such as the camera 100 shown in FIG. 1. The differential sensor 106 may include first and second polysilicon gates (PG A, PG B) 202A, 202B. The polysilicon gates 202A may be energized according to clock signal Clk_A and polysilicon gates 202B may be energized according to clock signal Clk_B. The two clock signals may be controlled differently to control the sensor array to measure different types of illumination. For example, to measured active modulated illumination the two clock signals may be substantially complementary (e.g., Clk_A and Clk_B have 50% duty cycles that are 180 degrees out of phase). In other examples, the two clock signals may have a different relationship, such as for measuring ambient illumination or non-modulated active illumination.

When activated based on the clock signals, the polysilicon gates 202A, 202B create electric fields that respectively attract and collect photoelectric charges to different respective regions 204A, 204B of the differential sensor 106 corresponding to the different polysilicon gates based on the arrival time under the polysilicon gate oxide in the region 204A, 204B. In particular, collected photoelectric charges remain under the gate where the photoelectric charges are initially collected and ultimately diffuse slowly by self-repulsion under each polysilicon gate to a collection node. A p-type doped area 206 or shallow trench isolation (STI) between the different regions creates a potential barrier that ensures charges collected by one polysilicon gate do not transfer to an adjacent polysilicon gate even if one is at a higher potential.

In FIG. 2A, both of the clock signals Clk_A and Clk_B are biased to a low voltage such that the polysilicon gates 202A, 202B collect little or no photoelectric charge in the regions 204A, 204B. In FIG. 2B, clock signal Clk_A is biased to a high voltage and Clk_B is biased to a low voltage. When the Clk_A goes high, the polysilicon gates 202A become energized and photoelectric charge is collected in region 204A as indicated by the electric field lines. The electric field lines run tangent to the boundary of region 204A, so charge does not transfer from region 204A to region 204B. Also, since Clk_B is biased low, the polysilicon gates 202B are not energized, and thus minimal photoelectric charge is collected in region 204B. In FIG. 2C, clock signal Clk_B is biased to a high voltage and Clk_A is biased to a low voltage. When the Clk_B goes high, the polysilicon gates 202B become energized and photoelectric charge is collected in region 204B as indicated by the electric field lines. The electric field lines run tangent to the boundary of region 204B, so charge does not transfer from region 204B to region 204A. Also, since Clk_A is biased low, the polysilicon gates 202A are not energized, and thus minimal photoelectric charge is collected in region 204A.

The differential sensor 106 is configured to collect and assign photoelectric charge in synchronicity with modulation of clock signals Clk_A and Clk_B. The photoelectric charge assignment (classification to PG A or B) in the differential sensor 106 occurs simultaneously with charge collection under the polysilicon gates 202A, 202B, and therefore does not require the additional step of shifting charges from one gate to another gate. In one example, the differential spectral measurement can be performed by synchronously activating a designated spectral illuminator within the 50% time period when the polysilicon gates 202A are energized to collect photoelectric charge from the active illumination in the region 204A. Additionally, the ambient light measurement can be performed by energizing the polysilicon gates 202B while the designated spectral illuminator is deactivated to collect photoelectric charge from the ambient light in the region 204B. The photoelectric charge collected by the region 204B (i.e., the amount of ambient light) is subtracted from the photoelectric charge collected by the region 204A (i.e., the amount of active light and ambient light) to perform a differential measurement in which the ambient light bias is significantly reduced or removed from the measurement of the active illumination. Note this example applies to a scenario where modulated active illumination and ambient illumination are differentially measured.

Such operation allows for the same sensor array to be used to efficiently measure active light across a broad spectrum including ultraviolet, visible, NIR, and IR light. Further, the differential sensors may reduce system noise because only one read operation is required to perform a differential measurement of active spectral light and ambient light. In particular, each pixel readout/reset operation may add system noise per occurrence. Thus, rather than performing two separate measurements (i.e., active, passive) that require two readouts, and then adding (or subtracting) each result to memory, a single differential measurement may be performed within the pixel and the single differential measurement may be read out to memory. The depicted differential sensor is provided as an example and other differential sensor configurations may be used in other examples.

In other camera implementations that do not include sensor arrays of differential sensors, additional clock cycles may be required to perform a differential measurement. While differential sensors provide the advantages described herein, it will be appreciated that any suitable type of sensor array, including non-differential sensor arrays, may be implemented.

The term 'address' as applied to sensors 106 of sensor array 104 may have a somewhat different meaning depending on the imaging mode described. For flat-imaging—for spectral light including both visible and IR light—addressing the sensors 106 may include integrating the intensity of active light in the sub-band emitted from the designated spectral (or IR) illuminator and received at each sensor 106 and associating the integrated intensity of the active light in the sub-band with the portion of the image corresponding to that sensor.

For depth imaging, the sensors 106 may be addressed differently. Here, addressing the sensors may include resolving a phase offset from each sensor relative to the modulated intensity of the IR light. The phase offset, optionally converted into the depth domain, may be associated with the portion of the image corresponding to the sensor addressed. In other words, the depth controller machine 128 may be configured to determine a depth value for each sensor 106 of the sensor array 104. In some implementations, a series of IR image acquisitions (e.g., 6-9) in rapid succession may be used to obtain the phase offset. In combination depth- and flat-imaging applications, both of the above addressing modes may be used in a time multiplexed manner.

The phase-discriminating time-of-flight (ToF) approach described above is one of several depth-imaging technologies encompassed by this disclosure. In general, a depth-imaging camera may be configured to acquire one or more depth maps of a scene or subject. The term 'depth map' refers to an array of pixels registered to corresponding regions $(X_i, Y_i)$ of an imaged scene, with a depth value (L) indicating, for each pixel, the depth of the corresponding region. 'Depth' is defined as a coordinate parallel to the optical axis of the camera, which increases with increasing distance from the camera. The term 'depth video' refers herein to a time-resolved sequence of depth maps. In ToF implementations, the IR illumination source may project pulsed or otherwise modulated IR illumination towards the scene. The sensor array of the depth-imaging camera may be configured to detect the phase offset between the illumination reflected back from the scene and the modulated emission. In some implementations, the phase offset of each sensor may be converted into a pixel-resolved time of flight of the pulsed illumination, from the illumination source to the scene and then back to the array. ToF data may then be converted into depth data.

The term 'spectral light image' refers to a matrix of pixels registered to corresponding regions $(X_i, Y_i)$ of an imaged scene, with a spectral value ($SV_i$) indicating, for each pixel, the spectral signature of the corresponding region in the particular spectral light sub-band. For acquiring the spectral light images in each of the sub-bands (e.g., for a multi-spectral image), the spectral controller machine 130 is configured to determine a spectral value for each of the differential sensors based on the depth value and a differential measurement of active spectral light and ambient light for the differential sensor.

The depth and multi-spectral data acquired by the camera 100 may be used to fit a neighborhood of pixels to a regular surface (e.g., Lambertian plane, quadric surface), and solve the backscattering (albedo) coefficient for each of the sub-bands in order to calculate a spectral signature of the surface that is ambient light-invariant and can be robustly classified. In such calculations, the depth data may be used to account for a reduction in light intensity due to optical transmission of the light from the light source (IR illuminator 114 or spectral illuminators 118) to the scene 102. In some implementations, the spectral controller machine 130 may be configured to calculate a surface normal for each pixel of the plurality of pixels of the sensor array based on the depth data. A set of surface normals for the plurality of pixels may represent a surface of an imaged scene or subject modeled by an analytic function (e.g., plane or quadric). In some implementations, the spectral controller machine 130 may be configured to calculate a curvature for each pixel of the plurality of pixels of the sensor array based on the depth data. A set of curvatures for the plurality of pixels may represent a surface of an imaged scene or subject modeled by an analytic function (e.g., plane or quadric). The spectral controller machine 130 may be configured to normalize the spectral light measurements in the different spectral light sub-bands based on one or more of the measured depth and the surface normal. This provides a position- and light-invariant spectral signature of an imaged scene or subject.

Output machine 132 is configured to output a matrix of pixels 140. Each pixel in the matrix includes the depth value ($Z_i$) and the spectral value (e.g., $SV1_i$, $SV2_i$, ... $SV6_i$) for each of the spectral light sub-bands of the plurality of spectral illuminators 118 of the camera 100. In some implementations, the output machine 132 may be further configured to, for each pixel, output a surface normal and/or a curvature. The output machine 132 may be configured to output the matrix of pixels 140 in any suitable form. In some examples, the output machine 132 may output the matrix of pixels 140 as a data structure in which each element of the matrix corresponds to a different pixel, and each element of the matrix includes an array of values corresponding to the spectral values for that pixel and optionally the depth value and optionally a surface normal. Note that a spectral value for the IR light sub-band may be determined for each differential sensor in the process of determining the depth value, and thus each pixel in the matrix may include a spectral value for the IR light sub-band. Further, note that the output machine 132 may be configured output the matrix of pixels 140 (and/or any other suitable parameter value) to any suitable recipient internal or external to the camera 100. In one example, the output machine 132 may be configured to output the matrix of pixels 140 to another processing component for additional image processing (e.g., filtering, computer vision). In some examples, the processing component may be incorporated into the camera 100. In some examples, the processing component may be incorporated into a remote computing device in communication with the camera 100. In another example, the output machine 132 may be configured to output the matrix of pixels 140 to an external display device for visual presentation as an image.

Figure 3:
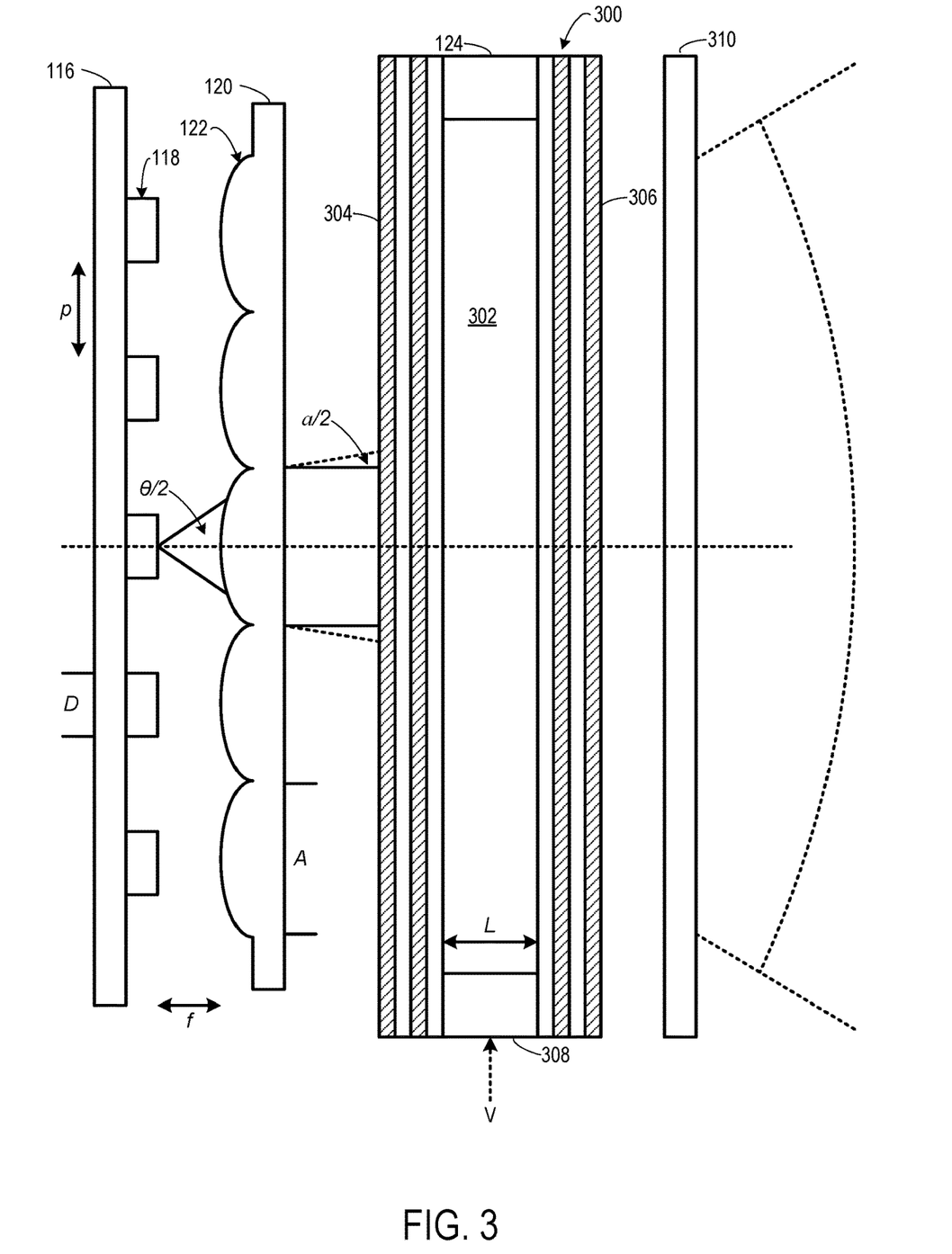
FIG. 3 schematically shows aspects of a tunable optical sensor for a spectral illuminator.

FIG. 3 schematically shows aspects of the tunable optical filter 124 and other illumination components of camera 100. The spectral illumination source 116 includes one or more spectral illuminators 118 depicted herein as an array of LEDs. Each LED has a given area (D), and a pitch (p) between LEDs in the array. Each LED emits active spectral light with a divergence angle ($\theta$). The collimating lens array 120 is arranged in front of the LED array 116 such that each collimating lens 122 is registered to an LED 118. In some examples, each collimating lens may be registered to a different LED. In some examples, each collimating lens may be used for multiples LEDs—i.e., multiple LEDs may emit light through the same collimating lens. Each collimating lens 122 is arranged to have a focal length (f), a collimated light area (A), and a collimation angle (a). Each of the collimating lenses 122 may be configured to have a reasonably short focal length (e.g., f=1 mm) that results in a collimation angle (a) of spectral light having a small angle of incidence (AOI) on the tunable optical filter 124. The collimation angle (a) may be based on the divergence angle ($\theta$), the LED area (D), and the collimated light area (A). In one example, each of the collimating lenses may be configured to have a collimation angle (a) that is less than 5° for p=1 mm, D=0.1 mm and $\theta$=50°. The small AOI of collimated spectral light on the tunable optical filter 124 may result in increased peak transmission of spectral light in the selected sub-band and sharper boundaries of the selected sub-band.

In some examples, the tunable optical filter 124 may include a Fabry-Perot interferometer 300 that is configured to selectively transmit spectral light in a selected sub-band (and multiple resonances) and substantially block spectral light outside of the selected sub-band (and multiple resonances). The Fabry-Perot interferometer 300 may be dynamically adjustable to change the selected sub-band of transmitted spectral light. The Fabry-Perot interferometer 300 includes an optical cavity 302 formed between a first reflective surface 304 and a second reflective surface 306. The first and second reflective surfaces 304, 306 may take any suitable form. In the depicted example, the reflective surfaces include distributed Bragg reflectors (DBRs) formed by quarter-wave ($\lambda/4$) dielectric layers with alternating high and low refractive indexes. In other examples, the reflective surfaces may include metallic layers (e.g., Aluminum). In still other examples, the reflective surfaces may include photonic crystals.

The Fabry-Perot interferometer 300 may be configured such that, when a spectral light sub-band satisfies a constructive interference condition of the Fabry-Perot interferometer 300, the output of the Fabry-Perot interferometer exhibits a resonance, i.e. a transmission peak at that sub-band. In the depicted example, the Fabry-Perot interferometer 300 is configured to change the constructive interference condition and correspondingly the selected sub-band of spectral light that is selectively transmitted by dynamically adjusting an optical cavity length (L). The optical cavity length (L) may be adjusted by an actuation mechanism 308. In one example, the actuation mechanism includes a piezoelectric actuator that expands/contracts based on a voltage (V) applied to the piezoelectric actuator. Any suitable electro/mechanical actuator or other actuation mechanism may be used to adjust the optical cavity length to dynamically adjust the Fabry-Perot interferometer for a selected sub-band.

In other examples, the Fabry-Perot interferometer 300 may be configured to change the selected sub-band of spectral light that is selectively transmitted by dynamically adjusting a refractive index of the optical cavity. In some such examples, the optical cavity may include a liquid crystal material having a refractive index that varies as a function of a voltage that is applied to the liquid crystal material. In other words, the Fabry-Perot interferometer may be dynamically adjusted to selectively transmit a selected sub-band of spectral light by adjusting a voltage applied to the liquid crystal material of the optical cavity.

Furthermore, in some cases, the liquid crystal material of the optical cavity 302 may be polarization sensitive. As such, the tunable optical filter 124 optionally may include polarization layers in order to achieve high transmission contrast (e.g., ON/OFF) in the selected sub-band. Note that using such polarization filters on the imaging stack covering the sensor array of the camera would result in a significant loss in signal strength (e.g., >50%) of incident light, because light reflected from the scene is typically unpolarized. On the other hand, illumination sources, such as lasers, are typically highly polarized (e.g., 95%) such that there is relatively little signal loss due to the polarization filters being incorporated on the illumination stack of the camera. Additionally, in some implementations, the illumination stack may include optical components configured to recycle light of the wrong polarization for the Fabry-Perot filter to further improve flexibility and efficiency.

In some examples, the Fabry-Perot interferometer 300 may be dynamically adjustable to select a plurality of resonances (i.e., interference orders) that cause a plurality of transmission peaks for different sub-bands. In other words, the Fabry-Perot interferometer may be tuned to selectively transmit spectral light in a plurality of selected sub-bands and substantially block spectral light outside of the plurality of selected sub-bands. Such a configuration may be used to probe a wide range of different sub-bands to enable broadband hyper-spectral imaging. In some such examples, resonances of the Fabry-Perot interferometer may be selected to substantially match the sub-bands of the plurality of different spectral illuminators. To collect spectral image data for the plurality of different sub-bands corresponding to the different spectral illuminators, the Fabry-Perot interferometer may be dynamically adjusted for the selected plurality of resonances corresponding to the plurality of different sub-bands. Then, for each sub-band, one or more of the spectral illuminators that output wavelengths of light that at least partially overlap with the selected sub-band may be activated while the other spectral illuminators are deactivated.

In other examples, the tunable optical filter 124 may include different spectral light sub-band tuning mechanisms instead of or in addition to a Fabry-Perot interferometer. In some examples, the tunable optical filter may include an acousto-optical tunable filter (AOTF). In some examples, the tunable optical filter may include birefringent liquid crystals layers (e.g., Lyot filter, Solc filter). It will be appreciated that the tunable optical filter may employ any suitable mechanism to dynamical change one or more selected sub-bands of spectral light that are selectively transmitted by the tunable optical filter.

An optical diffuser 310 optionally may be arranged optically intermediate the tunable optical filter 124 and the scene. The optical diffuser 310 may be configured to diffuse active spectral light selectively transmitted by the tunable optical filter 124 in a selected sub-band at large angles to illuminate the scene. In other examples, the active spectral light transmitted through the tunable optical filter may be steered or aimed towards designated region(s) of the scene, such as for scanning-type imaging. Such steering implementations may increase power efficiency.

The herein described configuration may provide various advantages over other configurations. For example, high power efficiency can be achieved by activating only spectral illuminator(s) (e.g., LEDs) corresponding to a selected resonance/sub-band. Further, such an implementation provides design flexibility with a trade-off between the number of spectral illuminators (e.g., LEDs) and the power efficiency. By using spectral illuminators (e.g., LEDs) with a wider bandwidth, one can reduce the number of spectral illuminators (e.g., LEDs) resulting in a more compact system at the cost of reduced power efficiency. Similarly, by using spectral illuminators (e.g., LEDs) with a narrower bandwidth, the power efficiency can be increased at the cost of an increased number of spectral illuminators (e.g., LEDs) to cover the entire wavelength range. The arrangement of the tunable optical filter in the illumination stack may enable a larger field of view because the sensor array in the imaging stack is not covered by the tunable optical filter. Moreover, the imaging stack can be designed without the added complexity of having a tunable optical filter between the scene and the sensor array. Such a configuration may be beneficial for mass production of such a camera at a consumer level. Furthermore, the beam size on active spectral light selectively transmitted by the Fabry-Perot interferometer can be designed to be small, which reduces the clear aperture needed for the Fabry-Perot interferometer. This design can potentially reduce the size, cost and complexity of the illumination stack and correspondingly the camera.

Figure 4:
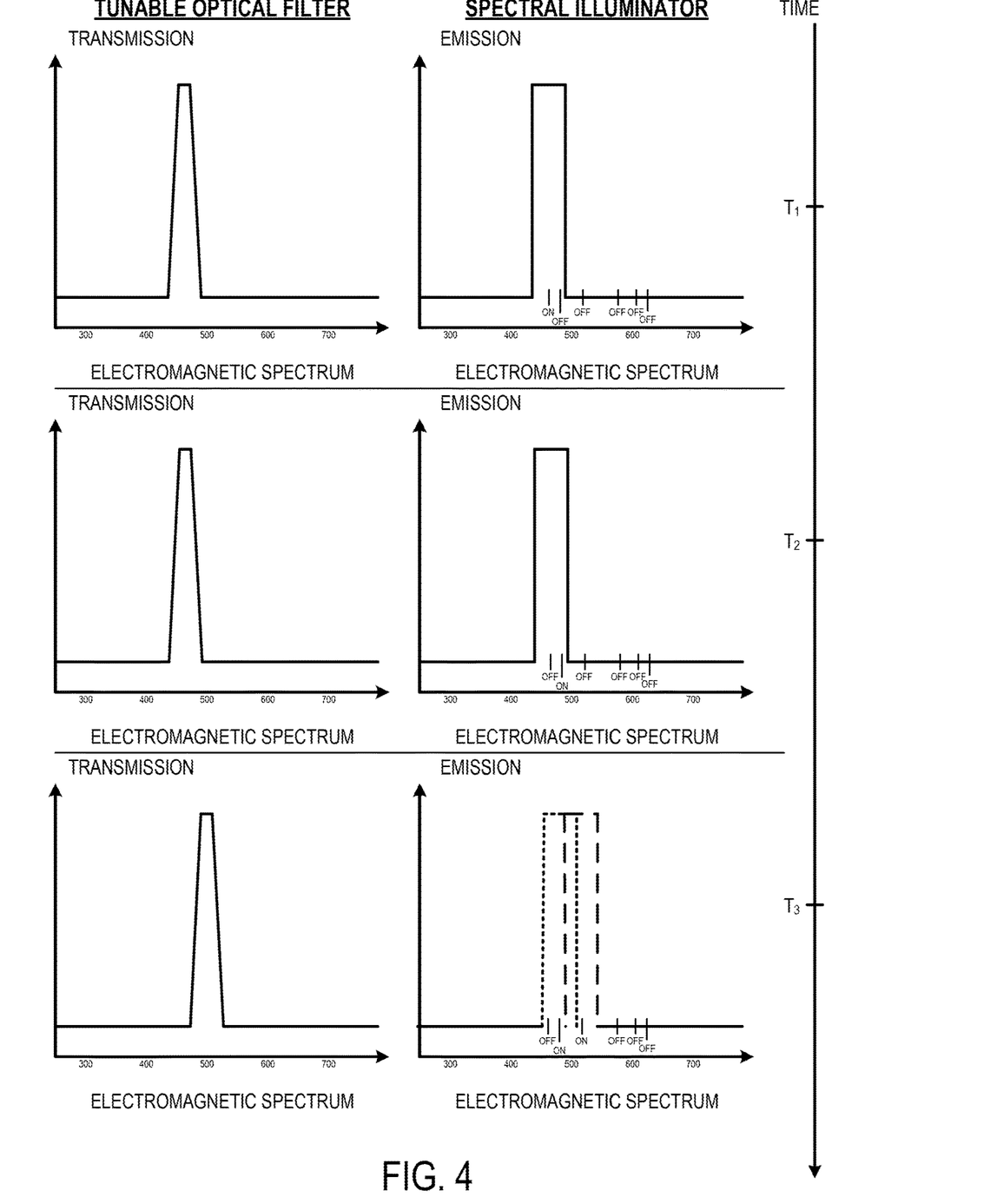
FIGS. 4-5 are timing graphs showing different example sequences of operation of a tunable optical filter of a camera.
Figure 5:
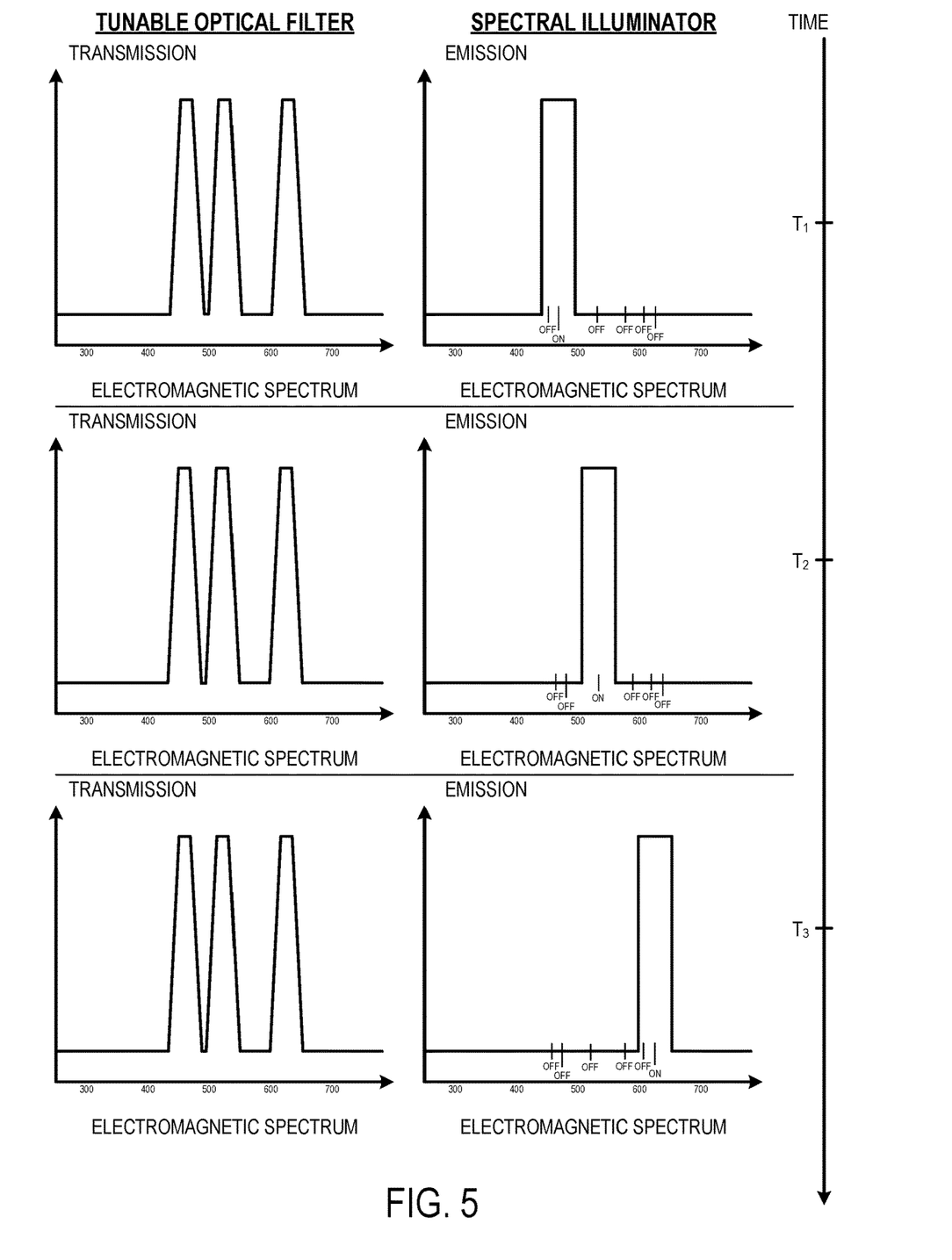

FIGS. 4 and 5 show example operation of aspects of a camera including a tunable optical filter and a plurality of spectral illuminators (e.g., deep blue (460 nm), blue (470 nm), true green (528 nm), yellow (587 nm), amber (617 nm), and red (625 nm)) that act as active illumination sources for multi-spectral image acquisition. Note that each of the spectral illuminators is indicated as being activated (i.e., ON) or deactivated (i.e., OFF) in each example. Further, note that the emission of spectral light from activated spectral illuminators is represented in idealized square wave form, although this is not required. FIG. 4 shows an example scenario where the tunable optical filter is dynamically adjusted to change a sub-band of spectral light that is transmitted by the tunable optical filter and one or more corresponding spectral illuminators are synchronously activated to emit active spectral light in the selected sub-band.

At time $T_1$, the tunable optical filter is dynamically adjusted to transmit spectral light in a selected sub-band with a peak at $\lambda$=470 (e.g., blue) and block spectral light outside of the selected sub-band. Additionally, the blue spectral illuminator having an emission band or spectrum that overlaps with the selected wavelength sub-band around the resonant order at 470 nm is activated and the other spectral illuminators that do not emit spectral light in the selected sub-band are deactivated in synchronicity with dynamic adjustment of the tunable optical filter. The blue active spectral light emitted from the spectral illuminator is transmitted by the tunable optical filter to illuminate the scene. The sensor array is addressed in synchronicity with activation of the spectral illuminator to acquire spectral image data for the selected sub-band at 470 nm. In addition, appropriate pass band filters on the imaging side optionally may be energized to minimize out of band energy collection by the sensor and thus improve sensor SNR.

At time $T_2$, the tunable optical filter is dynamically adjusted to transmit spectral light in a different selected sub-band with a peak at $\lambda=480$ (e.g., blue) and block spectral light outside of the selected sub-band. Additionally, the blue spectral illuminator having an emission band or spectrum that overlaps with the selected wavelength sub-band around the resonant order at 480 nm is activated and the other spectral illuminators that do not emit spectral light in the selected sub-band are deactivated in synchronicity with dynamic adjustment of the tunable optical filter. The blue active spectral light emitted from the spectral illuminator is transmitted by the tunable optical filter to illuminate the scene. The sensor array is addressed in synchronicity with activation of the spectral illuminator to acquire spectral image data for the selected sub-band at 480 nm. The spectral image data acquired at times $T_1$ and $T_2$ correspond to narrow sub-bands within an emission band of the blue spectral illuminator.

At time $T_3$, the tunable optical filter is dynamically adjusted to transmit spectral light in a different selected sub-band with a peak at $\lambda=500$ and block spectral light outside of the selected sub-band. In this case, two spectral illuminators emit active spectral light with emission bands or spectrums that overlap the selected sub-band. For example, the blue spectral illuminator is centered on 470 nm with a 20 nm FWHM and non-negligible output at 500 nm; the green spectral illuminator is centered on 528 nm with 20 nm FWHM and non-negligible output at 500 nm; and other spectral illuminators do not have significant output at 500 nm. As such, the blue and the green spectral illuminators are activated while the tunable optical filter is adjusted to 500 nm transmission. Active spectral light emitted from the two spectral illuminators that is within the selected sub-band is transmitted by the tunable optical filter to illuminate the scene. Active spectral light emitted by the two spectral illuminators that is outside the selected sub-band is blocked by the tunable optical filter. The sensor array is addressed in synchronicity with activation of the two spectral illuminators to acquire spectral image data for the selected sub-band at 500 nm.

In the above examples, the tunable optical filter is idealized and only transmits in the single selected band. Depending on the type of technology used for the tunable optical filter, one or more non-selected sub-bands may also be free to pass. For example, when a Fabry-Perot interferometer is used, multiple resonances may be transmitted along with the selected sub-band. As shown in FIG. 5, the spectral illuminators may be actively controlled to prevent such undesired sub-bands from illuminating the scene.

At time $T_1$, the tunable optical filter is dynamically adjusted to selectively transmit spectral light in a selected sub-band with a peak at $\lambda=470$ nm (e.g., blue), but the tunable optical filter would also transmit additional resonances 528 and 625 (e.g., green and red). Further, the tunable optical filter blocks spectral light outside of sub-bands 470 nm, 528 nm, and 625 nm. The blue spectral illuminator that having an emission band that overlaps with the selected wavelength sub-band around the resonant order at 470 nm is activated and the other spectral illuminators that do not emit spectral light in this sub-band are deactivated. The blue active spectral light emitted from the spectral illuminator at 470 nm is transmitted by the tunable optical filter to illuminate the scene. Note that even though the tunable optical filter would also transmit spectral light in the 528 nm (e.g., green) and 625 nm (e.g., red) sub-bands, the corresponding spectral illuminators having emission bands that overlap with the other resonances are deactivated so the tunable optical filter does not receive active spectral light in those sub-bands. The sensor array is addressed in synchronicity with activation of the spectral illuminator to acquire spectral image data for the selected blue sub-band at 470 nm.

In some scenarios, spectral image data may be acquired for the other resonances in addition to the selected sub-band. For example, at time $T_2$, the green spectral illuminator having an emission band or spectrum that overlaps with the resonance at 528 nm is activated and the other spectral illuminators that do not emit spectral light in this sub-band are deactivated. Note that the tunable optical filter does not need to be dynamically adjusted at this time. The green active spectral light at 528 nm emitted from the spectral illuminator is transmitted by the tunable optical filter to illuminate the scene. Note that even though the tunable optical filter would pass spectral light in the 470 nm (e.g., blue) and 625 nm (e.g., red) sub-bands, the corresponding spectral illuminators are deactivated so the tunable optical filter does not receive active spectral light in those sub-bands. The sensor array is addressed in synchronicity with activation of the spectral illuminator to acquire spectral image data for the selected green sub-band at 528 nm.

As another example, at time $T_3$, the red spectral illuminator having an emission band or spectrum that overlaps with the resonance at 625 nm is activated and the other spectral illuminators that do not emit spectral light in this sub-band are deactivated. Note that the tunable optical filter does not need to be dynamically adjusted at this time. The red active spectral light at 625 nm emitted from the spectral illuminator is transmitted by the tunable optical filter to illuminate the scene. Note that even though the tunable optical filter would pass spectral light in the 470 nm (e.g., blue) and 528 nm (e.g., green) sub-bands, the corresponding spectral illuminators are deactivated so the tunable optical filter does not receive active spectral light in those sub-bands. The sensor array is addressed in synchronicity with activation of the spectral illuminator to acquire spectral image data for the selected red sub-band at 625 nm.

In the above described example, the tunable optical filter is dynamically adjusted one time to select a sub-band, however the tunable optical filter also transmits multiple resonant sub-bands at this setting. The spectral illuminators corresponding to the plurality of sub-bands are sequentially activated to acquire spectral image data for each of the sub-bands. By sequentially activating the spectral illuminators, efficiency may be increased since only active spectral light in one selected sub-band is acquired at a time. Other sets of resonant sub-bands may be analyzed in a similar manner. The tunable optical filter may be dynamically adjusted to transmit any suitable plurality of resonances.

Figure 6:
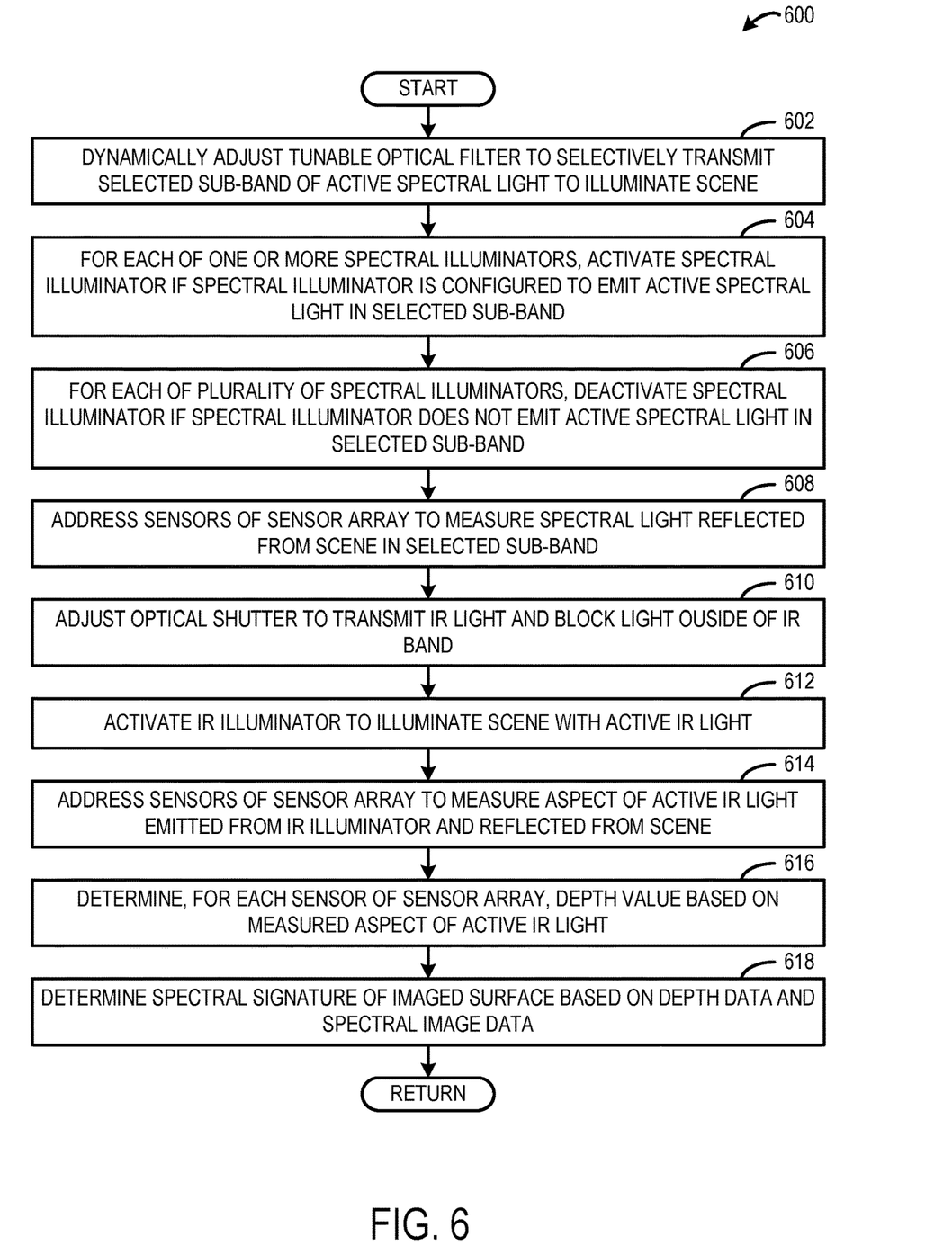
FIG. 6 shows an example image acquisition method.

FIG. 6 shows an example image acquisition method 600 using a tunable optical filter as described herein. For example, method 600 may be enacted by electronic controller 126 of camera 100.

At 602 of method 600, the tunable optical filter is dynamically adjusted to selectively transmit a selected sub-band of active spectral light to illuminate a scene. At 604 of method 600, for each of one or more spectral illuminators, the spectral illuminator is activated if the spectral illuminator is configured to emit active spectral light in the selected sub-band. In implementations in which a broad-band white illuminator is used, the white illuminator will be activated and the tunable optical filter will provide all wavelength selectivity. In implementations in which plural differently-colored spectral illuminators are used, spectral illuminators, or combinations thereof, having wavelengths that overlap the selected sub-band will be selectively activated. At 606 of method 600, for each of the one or more spectral illuminators, the spectral illuminator is deactivated if the spectral illuminator does not emit active spectral light in the selected sub-band or if it emits active light in one of the currently undesired resonances of the tunable optical filter. At 608 of method 600, sensors of a sensor array are addressed to measure spectral light reflected from the scene in the selected sub-band. These method steps may be performed repeatedly for a plurality of different selected sub-bands to acquire spectral image data for the plurality of different selected sub-bands for multi-spectral image acquisition. Moreover, these method steps may be performed repeatedly for a plurality of different selected sub-bands corresponding to each of the plurality different spectral illuminators to acquire spectral image data for hyper-spectral imaging.

In implementations where the camera is configured to also acquire depth data, at 610 of method 600, an optical shutter may be adjusted to transmit IR light and block light outside of the IR band (e.g., visible light). At 612 of method 600, an IR illuminator may be activated to illuminate the scene with the active IR light. At 614 of method 600, the sensors of the sensor array are addressed to measure an aspect of the active IR light emitted from the IR illuminator and reflected from the scene. At 616 of method 600, for each of the sensors, a depth value is determined based on the measured aspect of the active IR light. At 618 of method 600, a spectral signature of an imaged surface is determined based on the depth values and the spectral image data.

In some implementations, aspects of the method 600 may be performed using a camera with a single active spectral illumination source (e.g., modulated broad-band spectral illuminator) instead of a plurality of spectral illumination sources.

In some implementations, the methods and processes described herein may be tied to a computing system of one or more computing devices. In particular, such methods and processes may be implemented as a computer-application program or service, an application-programming interface (API), a library, and/or other computer-program product.

Figure 7:
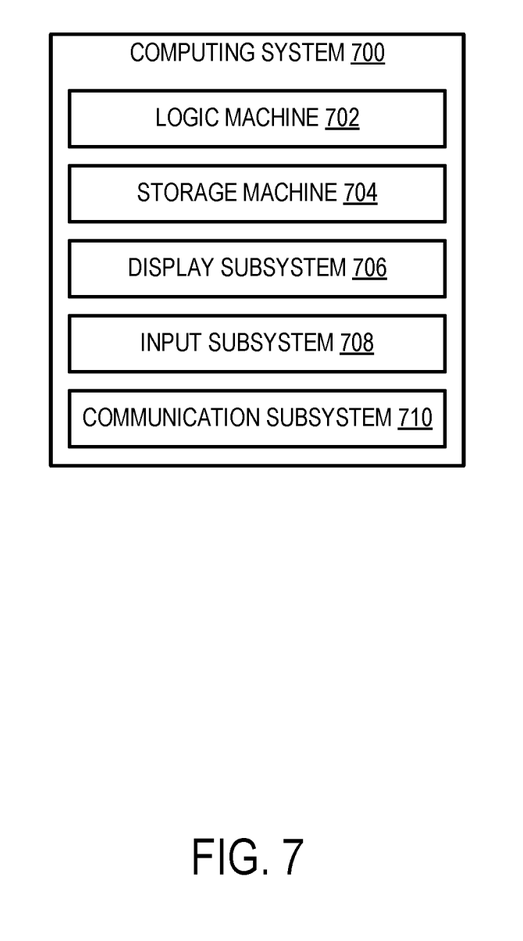
FIG. 7 shows an example computing system.

FIG. 7 schematically shows a non-limiting implementation of a computing system 700 that can enact one or more of the methods and processes described above. Computing system 700 is shown in simplified form. For example, computing system 700 may take the form of camera 100 or electronic controller 126 of FIG. 1.

Computing system 700 includes a logic machine 702 and a storage machine 704. Computing system 700 may optionally include a display subsystem 706, input subsystem 708, communication subsystem 710, and/or other components not shown in FIG. 700.

Logic machine 702 includes one or more physical devices configured to execute instructions. For example, the logic machine 702 may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine 702 may include one or more processors configured to execute software instructions. Additionally or alternatively, the logic machine 702 may include one or more hardware or firmware logic machines configured to execute hardware or firmware instructions. Processors of the logic machine 702 may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine 702 may be virtualized and executed by remotely accessible, networked computing devices configured in a cloud-computing configuration.

Storage machine 704 includes one or more physical devices configured to hold instructions executable by the logic machine 702 to implement the methods and processes described herein. When such methods and processes are implemented, the state of storage machine 704 may be transformed—e.g., to hold different data.

Storage machine 704 may include semiconductor memory (e.g., RAM, EPROM, EEPROM, etc.), and/or magnetic memory (e.g., hard-disk drive, floppy-disk drive, tape drive, MRAM, etc.), among others. Storage machine 704 may include volatile, nonvolatile, dynamic, static, read/write, read-only, random-access, sequential-access, location-addressable, file-addressable, and/or content-addressable devices.

It will be appreciated that storage machine 704 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 702 and storage machine 704 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 706 may be used to present a visual representation of data held by storage machine 704. This visual representation may take the form of display images translating matrix of pixels 132 into a visual format perceivable by a human. As the herein described methods and processes change the data held by the storage machine, and thus transform the state of the storage machine, the state of display subsystem 706 may likewise be transformed to visually represent changes in the underlying data. Display subsystem 706 may include one or more display devices utilizing virtually any type of technology. Such display devices may be combined with logic machine 702 and/or storage machine 704 in a shared enclosure, or such display devices may be peripheral display devices.

When included, input subsystem 708 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 710 may be configured to communicatively couple computing system 700 with one or more other computing devices. Communication subsystem 710 may include wired and/or wireless communication devices compatible with one or more different communication protocols. As non-limiting examples, the communication subsystem 710 may be configured for communication via a wireless telephone network, or a wired or wireless local- or wide-area network. In some embodiments, the communication subsystem 710 may allow computing system 700 to send and/or receive messages to and/or from other devices via a network such as the Internet.

In an example, a camera comprises one or more spectral illuminators configured to emit active spectral light, a tunable optical filter optically intermediate the one or more spectral illuminators and a scene, the tunable optical filter dynamically adjustable to change a selected sub-band of the active spectral light that illuminates the scene, a sensor array including a plurality of sensors, a spectral controller machine configured to dynamically adjust the tunable optical filter to selectively transmit a selected sub-band of the active spectral light to illuminate the scene, for at least one spectral illuminator, activate the spectral illuminator if the spectral illuminator is configured to emit active spectral light in the selected sub-band, and address the sensors of the sensor array to measure spectral light reflected from the scene in the selected sub-band. In this example and/or other examples, the tunable optical filter may include a Fabry-Perot interferometer comprising an optical cavity formed between a first reflective surface and a second reflective surface. In this example and/or other examples, the Fabry-Perot interferometer may be configured to change the sub-band of active spectral light that illuminates the scene by adjusting a length of the optical cavity. In this example and/or other examples, the optical cavity may include liquid crystal material, and the Fabry-Perot interferometer may be configured to change the sub-band of active spectral light that illuminates the scene by changing a refractive index of the liquid crystal material. In this example and/or other examples, the liquid crystal material may be polarization sensitive, and the one or more spectral illuminators may be configured to emit active spectral light with a polarization that substantially matches a polarization of the liquid crystal material. In this example and/or other examples, the tunable optical filter may be configured to substantially block active spectral light outside of the selected sub-band. In this example and/or other examples, the one or more spectral illuminators may include a broad-band spectral illuminator. In this example and/or other examples, the one or more spectral illuminators may include a plurality of spectral illuminators, at least one spectral illuminator configured to emit active spectral light in a different sub-band. In this example and/or other examples, sequentially one at a time for each of a plurality of spectral illuminators configured to emit different spectral light sub-bands, the spectral controller machine may be configured to activate a spectral illuminator, dynamically adjust the tunable optical filter to selectively transmit a sub-band that the spectral illuminator is configured to emit, and address the sensors of the sensor array to measure spectral light reflected from the scene in the sub-band. In this example and/or other examples, the spectral controller machine may be configured to for each of the plurality of spectral illuminators, deactivate the spectral illuminator if the spectral illuminator does not emit active spectral light in the sub-band. In this example and/or other examples, the selected sub-band may be a first selected sub-band, and the spectral controller machine may be configured to dynamically adjust the tunable optical filter to selectively transmit a second selected sub-band within a spectral band of the at least one spectral illuminator, and address the sensors of the sensor array to measure spectral light reflected from the scene in the second selected sub-band. In this example and/or other examples, the camera may further comprise an array of collimating lenses operatively intermediate the one or more spectral illuminators and the tunable optical filter, the array of collimating lenses configured to collimate the active spectral light emitted by the one or more spectral illuminators, and wherein the tunable optical filter receives substantially collimated active spectral light from the array of collimating lenses. In this example and/or other examples, the camera may further comprise an IR illuminator configured to emit active IR light in an IR light sub-band, an optical shutter positioned in between the sensor array and the scene, and a depth controller machine configured to adjust the optical shutter to transmit IR light in the IR light sub-band from the scene to the sensor array and block light outside of the IR sub-band, activate the IR illuminator to illuminate the scene with the active IR light, address the sensors of the sensor array to measure an aspect of the active IR light emitted from the IR illuminator and reflected from the scene, and determine, for each of the sensors, a depth value based on the measured aspect of the active IR light. In this example and/or other examples, the spectral controller machine may be configured to determine a surface normal of an imaged surface based on the depth value. In this example and/or other examples, the spectral controller machine may be configured to determine a spectral signature of an imaged surface based on the depth value and the measured spectral light.

In an example, an image acquisition method for a camera including one or more spectral illuminators configured to emit active spectral light and a tunable optical filter operatively intermediate the one or more spectral illuminators and a scene, comprises dynamically adjusting the tunable optical filter to selectively transmit a selected sub-band of the active spectral light to illuminate the scene, for at least one of the one or more spectral illuminators, activating the spectral illuminator if the spectral illuminator is configured to emit active spectral light in the selected sub-band, and addressing sensors of a sensor array of the camera to measure spectral light reflected from the scene in the selected sub-band. In this example and/or other examples, the camera may include a plurality of spectral illuminators, each spectral illuminator configured to emit spectral light in a different sub-band, and the method may comprise sequentially one at a time for at least one of the plurality of spectral illuminators activating the spectral illuminator, dynamically adjusting the tunable optical filter to selectively transmit a sub-band that the spectral illuminator is configured to emit, and addressing the sensors of the sensor array to measure spectral light reflected from the scene in the sub-band. In this example and/or other examples, the method may further comprise for each of the plurality of spectral illuminators, deactivating the spectral illuminator if the spectral illuminator does not emit active spectral light in the sub-band. In this example and/or other examples, the method may further comprise adjusting an optical shutter positioned in between the sensor array and the scene to transmit IR light in the IR light sub-band from the scene to the sensor array and block light outside of the IR sub-band, activating an IR illuminator of the camera to illuminate the scene with the active IR light, addressing the sensors of the sensor array to measure an aspect of the active IR light emitted from the IR illuminator and reflected from the scene, and determining, for each of the sensors, a depth value based on the measured aspect of the active IR light.

In an example, a camera comprises one or more spectral illuminators configured to emit active spectral light, a Fabry-Perot interferometer optically intermediate the one or more spectral illuminators and a scene, the Fabry-Perot interferometer dynamically adjustable to change a selected sub-band of the active spectral light that illuminates the scene, and a sensor array including a plurality of sensors each configured to measure spectral light reflected from the scene in the selected sub-band.

It will be understood that the configurations and/or approaches described herein are exemplary in nature, and that these specific implementations or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A camera comprising:
one or more spectral illuminators configured to emit active spectral light;
an IR illuminator configured to emit active IR light in an IR light sub-band;
a tunable optical filter optically intermediate the one or more spectral illuminators and a scene, the tunable optical filter dynamically adjustable to change a selected sub-band of the active spectral light that illuminates the scene;
a sensor array including a plurality of sensors; and
a spectral controller machine configured to:
dynamically adjust the tunable optical filter to selectively transmit a selected sub-band of the active spectral light to illuminate the scene,
for at least one spectral illuminator, activate the spectral illuminator if the spectral illuminator is configured to emit active spectral light in the selected sub-band,
address the sensors of the sensor array to measure spectral light reflected from the scene in the selected sub-band; and
a depth controller machine configured to:
active the IR illuminator to illuminate the scene with the active IR light,
address the sensors of the sensor array to measure an aspect of the active IR light emitted from the IR illuminator and reflected from the scene, and
determine, for each of the sensors, a depth value based on the measured aspect of the active IR light.

2. The camera of claim 1, wherein the tunable optical filter includes a Fabry-Perot interferometer comprising an optical cavity formed between a first reflective surface and a second reflective surface.

3. The camera of claim 2, wherein the Fabry-Perot interferometer is configured to change the sub-band of active spectral light that illuminates the scene by adjusting a length of the optical cavity.

4. The camera of claim 2, wherein the optical cavity includes liquid crystal material, and wherein the Fabry-Perot interferometer is configured to change the sub-band of active spectral light that illuminates the scene by changing a refractive index of the liquid crystal material.

5. The camera of claim 4, wherein the liquid crystal material is polarization sensitive, and wherein the one or more spectral illuminators are configured to emit active spectral light with a polarization that substantially matches a polarization of the liquid crystal material.

6. The camera of claim 1, wherein the tunable optical filter is configured to substantially block active spectral light outside of the selected sub-band.

7. The camera of claim 1, wherein the one or more spectral illuminators includes a broad-band spectral illuminator.

8. The camera of claim 1, wherein the one or more spectral illuminators includes a plurality of spectral illuminators, at least one spectral illuminator configured to emit active spectral light in a different sub-band.

9. The camera of claim 8, wherein sequentially one at a time for each of a plurality of spectral illuminators configured to emit different spectral light sub-bands, the spectral controller machine is configured to:
activate a spectral illuminator,
dynamically adjust the tunable optical filter to selectively transmit a sub-band that the spectral illuminator is configured to emit, and
address the sensors of the sensor array to measure spectral light reflected from the scene in the sub-band.

10. The camera of claim 9, wherein the spectral controller machine is configured to:
for each of the plurality of spectral illuminators, deactivate the spectral illuminator if the spectral illuminator does not emit active spectral light in the sub-band.

11. The camera of claim 1, wherein the selected sub-band is a first selected sub-band, and wherein the spectral controller machine is configured to:
dynamically adjust the tunable optical filter to selectively transmit a second selected sub-band within a spectral band of the at least one spectral illuminator, and
address the sensors of the sensor array to measure spectral light reflected from the scene in the second selected sub-band.

12. The camera of claim 1, further comprising:
an array of collimating lenses operatively intermediate the one or more spectral illuminators and the tunable optical filter, the array of collimating lenses configured to collimate the active spectral light emitted by the one or more spectral illuminators, and wherein the tunable optical filter receives substantially collimated active spectral light from the array of collimating lenses.

13. The camera of claim 1, further comprising:
an optical shutter positioned in between the sensor array and the scene; and wherein
the depth controller machine is configured to:
adjust the optical shutter to transmit IR light in the IR light sub-band from the scene to the sensor array and block light outside of the IR sub-band while activating the IR illuminator to illuminate the scene with active IR light.

14. The camera of claim 13, wherein the spectral controller machine is configured to:
determine a surface normal of an imaged surface based on the depth value.

15. The camera of claim 13, wherein the spectral controller machine is configured to:
determine a spectral signature of an imaged surface based on the depth value and the measured spectral light.

16. An image acquisition method for a camera including one or more spectral illuminators configured to emit active spectral light, an IR illuminator configured to emit active IR light, a tunable optical filter operatively intermediate the one or more spectral illuminators and a scene, a sensor array, and a optical shutter positioned in between the sensor array and the scene, the method comprising:
  dynamically adjusting the tunable optical filter to selectively transmit a selected sub-band of the active spectral light to illuminate the scene;
  for at least one of the one or more spectral illuminators, activating the spectral illuminator if the spectral illuminator is configured to emit active spectral light in the selected sub-band;
  addressing sensors of the sensor array to measure spectral light reflected from the scene in the selected sub-band;
  adjusting the optical shutter to transmit IR light in the IR light sub-band from the scene to the sensor array and block light outside of the IR sub-band;
  activating the IR illuminator to illuminate the scene with the active IR light;
  addressing the sensors of the sensor array to measure an aspect of the active IR light emitted from the IR illuminator and reflected from the scene; and
  determining, for each of the sensors, a depth value based on the measured aspect of the active IR light.

17. The method of claim 16, wherein the camera includes a plurality of spectral illuminators, each spectral illuminator configured to emit spectral light in a different sub-band, and wherein the method comprises sequentially one at a time for at least one of the plurality of spectral illuminators:
  activating the spectral illuminator;
  dynamically adjusting the tunable optical filter to selectively transmit a sub-band that the spectral illuminator is configured to emit; and
  addressing the sensors of the sensor array to measure spectral light reflected from the scene in the sub-band.

18. The method of claim 17, wherein the method further comprises:
  for each of the plurality of spectral illuminators, deactivating the spectral illuminator if the spectral illuminator does not emit active spectral light in the sub-band.

19. A camera comprising:
  one or more spectral illuminators configured to emit active spectral light;
  an IR illuminator configured to emit active IR light in an IR light sub-band;
  a Fabry-Perot interferometer optically intermediate the one or more spectral illuminators and a scene, the Fabry-Perot interferometer dynamically adjustable to change a selected sub-band of the active spectral light that illuminates the scene;
  a sensor array including a plurality of sensors each configured to measure spectral light reflected from the scene in the selected sub-band;
  an optical shutter positioned in between the sensor array and the scene;
  a spectral controller machine configured to:
    dynamically adjust the Fabry-Perot interferometer to selectively transmit a selected sub-band of the active spectral light to illuminate the scene,
    for at least one spectral illuminator, activate the spectral illuminator if the spectral illuminator is configured to emit active spectral light in the selected sub-band, and
    address the sensors of the sensor array to measure spectral light reflected from the scene in the selected sub-band; and
  a depth controller machine configured to:
    adjust the optical shutter to transmit IR light in the IR light sub-band from the scene to the sensor array and block light outside of the IR sub-band;
    activate the IR illuminator to illuminate the scene with the active IR light,
    address the sensors of the sensor array to measure an aspect of the active IR light emitted from the IR illuminator and reflected from the scene, and
    determine, for each of the sensors, a depth value based on the measured aspect of the active IR light.

20. A camera comprising:
one or more spectral illuminators configured to emit active spectral light;
a tunable optical filter optically intermediate the one or more spectral illuminators and a scene, the tunable optical filter dynamically adjustable to change a selected sub-band of the active spectral light that illuminates the scene;
a sensor array including a plurality of differential sensors; and
a spectral controller machine configured to:
dynamically adjust the tunable optical filter to selectively transmit a selected sub-band of the active spectral light to illuminate the scene,
for at least one spectral illuminator, activate the spectral illuminator if the spectral illuminator is configured to emit active spectral light in the selected sub-band, and
address each of the differential sensors for an illuminated duration in which the spectral illuminator is activated and for an ambient-only duration in which the spectral illuminator is turned off to differentially measure ambient light and the active spectral light reflected from the scene back to the differential sensor.

* * * * *